Patented May 13, 1930

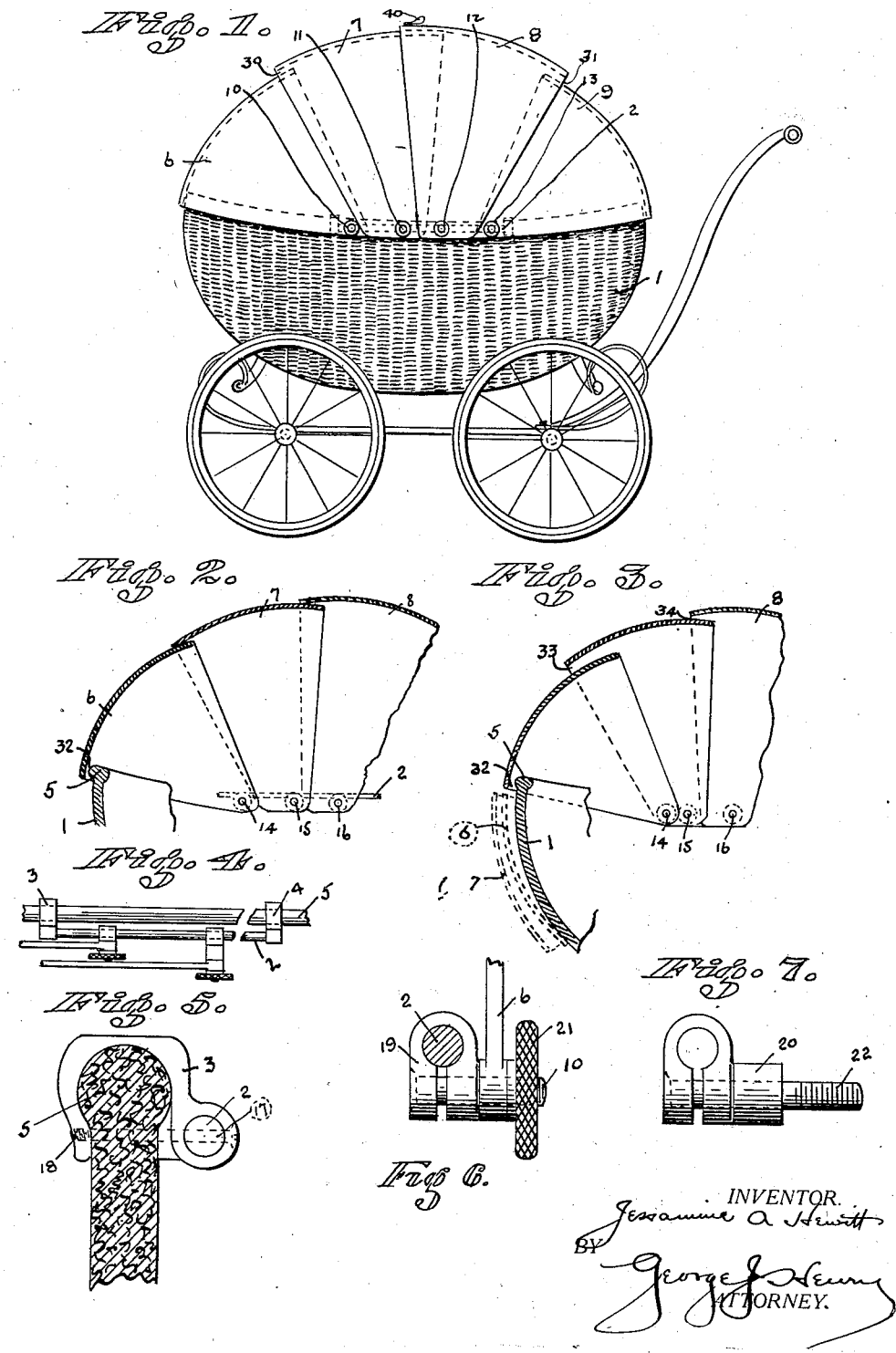

1,758,112

UNITED STATES PATENT OFFICE

JESSAMINE A. HEWITT, OF BERKELEY, CALIFORNIA

BABY-CARRIAGE TOP

Application filed November 13, 1928. Serial No. 319,074.

My invention has for its object an adjustable sectionalized top particularly adapted to baby buggies, baskets, beds and the like; and comprising a plurality of independently adjustable and collapsible members which in their extended position form a complete covering and protection over the body portion of the buggy and when collapsed, fall into and an out of the way position adjacent the buggy body.

The sections are independently adjustable to vary the ventilation or protection from storm conditions while in their extended position.

My invention will be better understood by referring to the accompanying drawing and description.

In the drawing Fig. 1 is a side view of a baby buggy equipped with one form of my invention.

Fig. 2 is a fragmentary detail of a portion of the top in the extended position and showing one position of adjustment of the several sections, with a portion of one of the top sections broken away to show its position relative to the buggy body.

Fig. 3 is a fragmentary cross section of two of the adjacent top sections and a portion of the buggy body.

Figs. 4, 5, 6 and 7 are details of the supporting, hinging and adjusting mechanism.

Throughout the figures similar numerals refer to identical parts.

The body portion of a conventional baby carriage is indicated by the numeral 1, on each side of which is mounted a bearing rod 2, supported by clips 3, 4, respectively and spaced from the rim 5 of the body 1, and on which rod are mounted a plurality of sliding bearing members from which the several sections which form the buggy top are pivotally mounted, there being one bearing member on each side of the buggy body for each of the said sections.

In Fig. 1, the buggy top is indicated as composed of sections 6, 7, 8 and 9 and on the near side of the buggy these are supported from the sliding pivot members 10, 11, 12 and 13 respectively, and on the opposite side of the buggy sections 6, 7, and 8 are shown in Figs. 2 and 3 as supported from the pivot members 14, 15, 16 respectively.

The clamps as 3 and 4 are fixed about the buggy rim as by the screw 17, passing through the rod 2 and engaging the opposite side of the clamp and at 18 whereby the two sides of the clamp are compressed against the rim 5.

The sliding pivot or bearing members are shown in detail in Figs. 6 and 7 and each comprises a slidable clamp 19 having a pivot 10, and finger nut 21, and between the nut 21 and clamp 19 is mounted one side of the top section, the other side of the said top section being supported in the same manner by another sliding bearing member movable on a similar rod on the opposite side of the buggy.

Because of the adjustability of the sliding member on the rod 2 and the telescoping of the top sections more specifically described below, the pivot for the section 7 is extended as shown in Figs. 4 and 7 wherein the bushing 20 and longer pivot 22 is provided so that the middle sections as 7 and 8 when collapsed, will clear the head of the pivot 10.

It will now be seen that the top sections each provided with independent pivots may be adjusted by the sliding movement on the rods 2, so as to occupy several different positions, three different possible positions being shown in Figs. 1, 2 and 3. Thus in Fig. 1, sections 6 and 9 are adjusted close to the rim 5, but allowing ventilation space as at 30, 31 between the sections 6 and 7 and sections 9 and 8 respectively, the center sections 9 and 8 being fully closed and locked by the means 40.

In Fig. 2 the sections have been adjusted by sliding the bearing members on the rods 2, securing a ventilation space at 32 between section 6 and the rim 5, whereas the sections 6 and 7 and 8 are closed at their adjacent boundaries.

In Fig. 3 ventilation space is provided at 32, as in Fig. 2, and in addition the bearings 15 and 16 have been adjusted on the rod 2, relative to the bearing 14, so that ventilation space is provided also at 33.

When the top is not in use the several finger members as 21 are loosened and the sections collapsed into their dotted positions on each end of the buggy as shown in Fig. 3; 6 and 7 overlapping about one end of the buggy body 1 and sections 8 and 9 collapsing in a like manner over the opposite end of the buggy.

When the sections are all in the position of Fig. 2 the baby is fully protected from wind and storm conditions while still retaining a ventilation at 32.

The same is true of the setting shown in Fig. 1, ventilation being attained at 30 and 31 but all openings adjacent the head of the baby are closed.

In the setting shown in Fig. 3 complete ventilation is attained at 32, 33 and also, if desired, by corresponding openings on the other side of the buggy.

The sections are all independently adjustable and meet the requirements for every possible condition of weather and protection in a unitary structure characterized by lightness, ease of operation and efficient results.

Referring particularly to Fig. 1, it is to be noted that at 40 is shown a fastening by which the sections 7 and 8 may be locked together and I have found the type of fasteners employed on windows to be well adapted to this use.

I have also found that the several sections may, with advantage be made of framework of the type employed in umbrella rib material, but preferably of heavier metal and deeper section and that such frames covered with translucent material as silk or netting, have the advantage of lightness and simplicity of operation, may be washed and afford protection from insects as well as the weather, while allowing a soft light under the cover.

While I have shown one form of my invention, I do not wish to be understood as limiting myself thereto, as it may be employed in various other combinations with other types of buggies and buggy bodies, baskets, beds, and the like, and with various numbers of sections, some, or all of which may be adjustable as shown.

I claim:

1. In combination with a baby buggy or the like, a top comprising a plurality of sections, each section separately pivoted on two sides of said buggy and a plurality of the sections adapted to telescopically collapse into out of use position adjacent each end of said buggy and adapted to be moved into position to substantially cover said buggy, a support member on each side and spaced from said buggy, means engaging each pivot to slide on said member and clamp means to lock said pivot on said member.

2. In combination with a baby buggy or the like, a top comprising a plurality of sections, each section separately pivoted on two sides of said buggy and a plurality of the sections adapted to telescopically collapse into out of use position adjacent each end of said buggy and adapted to be moved into position to substantially cover said buggy, a support member on each side and spaced from said buggy, means engaging each pivot to slide on said member and clamp means to lock said pivot on said member, and to simultaneously clamp the respective section against movement on said pivot.

3. In combination with a baby buggy or the like, a top comprising a plurality of sections, each section separately pivoted on two sides of said buggy and a plurality of the sections adapted to telescopically collapse into out of use position adjacent each end of said buggy, a rod on each side of said buggy and a U shaped member for each pivot slidable on said rod, said pivot passing through said member and a finger member for each pivot whereby a movement of the finger member clamps the section and the respective member on the rod.

JESSAMINE A. HEWITT.